United States Patent [19]

Simizu

[11] 4,216,140

[45] Aug. 5, 1980

[54] ROOM TEMPERATURE VULCANIZABLE POLYORGANOSILOXANE COMPOSITION

[75] Inventor: Chiyuki Simizu, Oota, Japan

[73] Assignee: Toshiba Silicone Co., Ltd., Tokyo, Japan

[21] Appl. No.: 973,580

[22] Filed: Dec. 27, 1978

[30] Foreign Application Priority Data

Dec. 28, 1977 [JP] Japan ................................. 52-159979

[51] Int. Cl.$^2$ ............................................... C08K 3/10
[52] U.S. Cl. ............................ 260/45.75 R; 260/18 S; 260/37 SB; 260/45.7 R; 528/34; 528/38; 528/901
[58] Field of Search ................... 260/45.7 R, 45.75 R, 260/37 SB, 18 S; 528/34, 38, 901

[56] References Cited

U.S. PATENT DOCUMENTS

| | | | |
|---|---|---|---|
| 3,318,898 | 5/1967 | Boissieras et al. | 528/34 |
| 3,711,520 | 1/1973 | Pfeifer et al. | 260/45.75 R |
| 4,075,154 | 2/1978 | Itoh et al. | 528/33 |

*Primary Examiner*—Melvyn I. Marquis
*Attorney, Agent, or Firm*—Blanchard, Flynn, Thiel, Boutell & Tanis

[57] ABSTRACT

Room temperature vulcanizable polyorganosiloxane composition comprising (A) 100 parts of polydiorganosiloxane in which 0.1 to 25 mole percent of the total organo groups that are attached to silicon atoms are phenyl groups, and having a viscosity of 100 to 1,000,000 cSt at 25° C., and in which silanol-terminated polydiorganosiloxane constitutes more than 60 weight % of the total, (B) 0.1 to 50 parts of an organic silicon compound containing aminoxy groups, (C) 75 to 300 parts of aluminum hydroxide powder having a size of less than 50 microns and (D) 0.000001 to 0.005 parts, calculated platinum, of platinum or a compound thereof. The composition is curable at room temperature whereby it gives an elastomer having low modulus, high elongation, and a self-extinguishing property.

12 Claims, 1 Drawing Figure

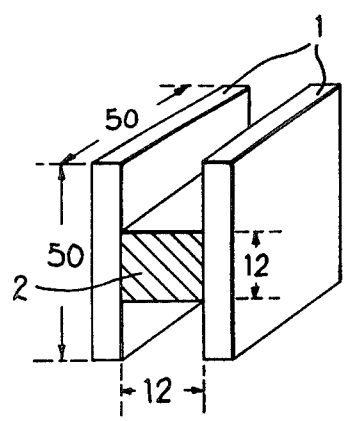

ROOM TEMPERATURE VULCANIZABLE POLYORGANOSILOXANE COMPOSITION

BACKGROUND OF THE INVENTION

1. Field of the Invention

The present invention relates to a self-extinguishing room temperature vulcanizable polyorganosiloxane composition in which an elastomer is formed by cross-linking one or a mixture of silanol-terminated polydiorganosiloxanes containing phenyl groups bonded with the silicon atoms with an aminoxy group-containing organosilicon compound, characterized in that finely divided powder of aluminum hydroxide is incorporated therein for imparting a self-extinguishing property thereto.

2. Description of the Prior Art

There has been known a polyorganosiloxane composition which cures at room temperature to form an elastomer and a process for preparing the same, which comprises reacting a polydiorganosiloxane in which the molecular chain is terminated with hydroxyl groups, with an organosilicon compound in which a diorganoaminoxy group or cyclic organoaminoxy group is bonded with silicon atom to effect the cross-linkage, thereby liberating diorganohydroxylamine or cyclic organohydroxylamine. The composition is used frequently as a sealing material for construction purposes because of its property of forming an elastomer having an ultra-high elongation and a very low modulus. Recently, safety of buildings against fires has been demanded and flame-retarding properties are required of sealing materials. However, sealing materials comprising room temperature vulcanizable polyorganosiloxane compositions including the above described composition are generally not resistant to fire, but rather they have a continuous burning property. Thus, it has been difficult to satisfy the requirement for a flame-retarding property. There has been known a self-extinguishing, room temperature vulcanizable polyorganosiloxane composition characterized by containing platinum and finely divided powder of carbon as flame-retarding agent. However, this composition cannot form an elastomer of a low modulus and a high elongation, as is obtained from an aminoxy-group-containing organosilicon compound, because the cross-linking agent used therein is an oxime-group-containing silicon compound. In addition, since the elastomer thus obtained is black or dark in color due to the finely divided powder of carbon contained therein, the product is unsuitable for use as a sealing material for construction wherein a high elongation and a low modulus are indispensable and coloring in various colors is required.

SUMMARY OF THE INVENTION

The inventor has found that an intrinsically white, self-extinguishing, room temperature vulcanizable polyorganosiloxane composition capable of being colored in any color and having a low modulus and a high elongation can be obtained by incorporating finely divided aluminum hydroxide powder and platinum and/or a platinum compound in a mixture of (a) one or a mixture of polydiorganosiloxanes containing silanol-terminated polydiorganosiloxane and phenyl groups bonded with silicon atoms and (b) an aminoxy group-containing organosilicon compound. The term "one or a mixture of polydiorganosiloxanes" used herein means either silanol-terminated polydiorganosiloxane alone or a mixture thereof with a triorganosilyl-group-terminated polydiorganosiloxane. A polyorganosiloxane synthesized by an ordinary method is a mixture of compounds of various molecular weights regardless of the terminal groups thereof. It has been known that phenyl groups combined with silicon atoms have an effect of improving the heat resistance of polyorganosiloxanes. However, the effect thereof of improving the flame retardancy is not always obtained depending on the inorganic substance that is used therewith. It has been known to use phenyl group-containing polyorganosiloxanes together with a copper compound for improving the flame-retardancy of heat curable silicone rubber (Official Gazette of Japanese Patent Publication No. 5583/1959). The copper compounds used in the invention disclosed in the above cited Official Gazette, such as a copper oxide, are dark in color and, accordingly, the heat curable silicone rubber obtained containing the copper compound is gray or brown, whereby it becomes impossible to obtain the desired coloration sometimes.

The present invention relates to a room temperature vulcanizable polyorganosiloxane composition comprising:

(A) 100 parts by weight of one or a mixture of polydiorganosiloxanes having a viscosity of 100–1,000,000 cSt at 25° C., 0.1–25 mole % of the total organs groups bonded with silicon atoms are phenyl groups and wherein more than 60 wt. % of the total polydiorganosiloxane component is silanol-terminated polydiorganosiloxane, (B) 0.1–50 parts by weight of an aminoxy group-containing organosilicon compound which contains, on the average more than two substituted aminoxy groups of the general formula:

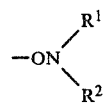

wherein $R^1$ and $R^2$ each represent a monovalent hydrocarbon group, or the general formula:

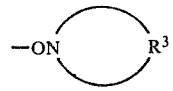

wherein $R^3$ represents a divalent organic group, bonded with silicon atom in the molecule, (C) 75–300 parts by weight of finely divided powder of aluminum hydroxide of a particle diameter of less than 50 microns, and (D) 0.000001–0.005 part by weight, calculated as platinum, of platinum and/or a platinum compound.

Polydiorganosiloxane (A) used in the present invention is a silanol-terminated polydiorganosiloxane or a mixture thereof with a triorganosilyl-group-terminated polydiorganosiloxane containing more than 60 wt. %, preferably more than 80 wt. % of the former, wherein 0.1–25 mole %, preferably 0.1–10 mole %, of the total organo groups are phenyl groups. More particularly, in case the polydiorganosiloxane is comprised of the silanol-terminated polydiorganosiloxane alone, the former must contain the phenyl groups. In case the polydiorganosiloxane is comprised of a mixture of silanol-terminated polydiorganosiloxane and triorganosilyl group-terminated polydiorganosiloxane, either one may be free of phenyl groups. In either case, as a whole, 0.1–25 mole % of the total organo groups bonded with silicon atoms must be phenyl groups. If the amount of the silanol-terminated polydiorganosiloxane is less than 60 wt. %, the mechanical properties of the product after curing are deteriorated and polysiloxane bleeds out, thereby reducing the adhesive strength unfavorably, because the triorganosilyl-terminated polydiorganosiloxane which does not participate in the cross-linking is present in a large amount. If the phenyl group content is more than 25 mole %, the smoke generated when it is burnt is increased sharply in amount and, on the other hand, if it is less than 0.1 mole %, a satisfactory self-extinguishing property cannot be obtained. As organic groups other than phenyl groups, there may be mentioned, for example, alkyl groups having 1 to 18 carbon atoms, such as methyl, ethyl, propyl, butyl and hexyl, alkenyl groups such as vinyl and allyl and those hydrocarbon groups in which a part of the hydrogen atoms is substituted with a halogen atom or nitrile group. For obtaining particularly excellent properties for sealing materials such as a low modulus, weather resistance, suitable curing velocity and fluidity of the composition before curing, it is preferred that the organo groups other than phenyl groups comprise only methyl groups. In such a case, polydiorganosiloxane (A) can be synthesized easily. The viscosity of component (A) is adjusted to be in the range of 100–1,000,000 cSt at 25° C., because when the viscosity is lower than this range, the physical properties of the product after curing are poor and when the viscosity is higher than this range, the workability becomes insufficient. The preferred range of viscosity is 500–100,000 cSt at 25° C.

Aminoxy-group-containing organosilicon compound (B) contains more than 2, on the average, of diorganoaminoxy groups or cyclic organoaminoxy groups in the molecule. It is selected from the group consisting of silanes, linear siloxanes, branched siloxanes and cyclic siloxanes. Usually, a proper mixture of an organosilicon compound containing two aminoxy groups and an organosilicon compound containing three or more aminoxy groups is used. As the organic groups bonded with the nitrogen atom of the organoaminoxy group, there may be mentioned, for example, monovalent hydrocarbon groups including alkyl having 1 to 8 carbon atoms, such as methyl, ethyl, propyl, butyl, hexyl, and cyclohexyl, vinyl and phenyl. As the organic groups bonded with the nitrogen atom of the cyclic organoaminoxy group, there may be mentioned, for example, divalent organic groups including an alkylene of $C_{3\sim6}$, preferably butylene and pentene and ethyleneoxyethylene group. In view of the availability of raw materials, ease of synthesis, reactivity and volatilization of the organohydroxylamine released, the aminoxy group of component (B) is preferably $-ON(C_2H_5)_2$. As organosilicon compounds containing aminoxy groups, the following compounds may be mentioned:

$C_6H_5Si[O(CH_3)_2SiON(C_3H_7)_2]_3$,
$(C_2H_5)_2NO(CH_3)_2SiO(CH_3)_2SiON(C_2H_5)_2$,
$(C_2H_5)_2NO(CH_3)_2SiO(C_6H_5)_2SiO(CH_3)_2SiON(C_2H_5)_2$,

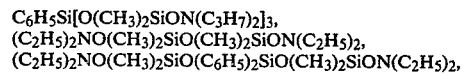

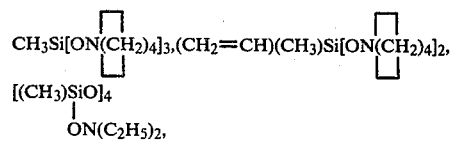

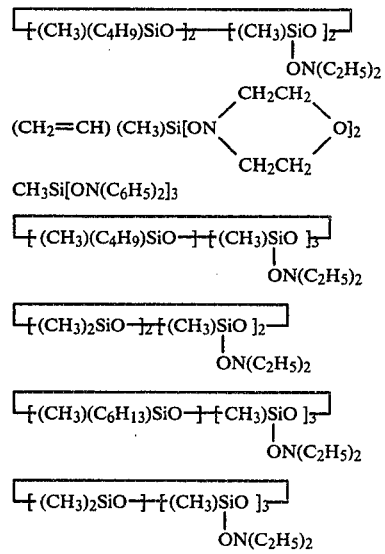

$CH_3Si[ON(C_6H_5)_2]_3$

The amount of the aminoxy-group-containing organosilicon compound is selected in the range of 0.1–50 parts by weight, preferably 1–10 parts by weight per 100 parts by weight of polydiorganosiloxane (A). When it is used in a smaller amount, the necessary cross-linking density cannot be obtained and, on the other hand, when it is used in a larger amount, the stability and curing property of the composition are deteriorated and such an excess amount is economically unfavorable.

Finely divided aluminum hydroxide powder (C) used in the present invention is indispensable for obtaining a self-extinguishing and white elastomer having an ultra-high elongation and an extremely low modulus. The finely divided aluminum hydroxide powder may be either surface-treated with stearic acid or metaphosphoric acid or not. In case a surface-treated aluminum hydroxide powder is used, the workability is not deteriorated even if it is used in a large amount. This component (C) must be divided finely to a particle diameter of less than 50 microns, since with a larger particle diameter, the surface smoothness and appearance after the curing of the composition becomes poor. The amount of component (C) is selected in the range of 75–300 parts by weight, preferably 100–200 parts by weight, per 100 parts by weight of polydiorganosiloxane (A). When component (C) is used in a smaller amount, the excellent self-extinguishing property cannot be obtained, and, on the other hand, when it is used in a larger amount, the excellent physical properties of the rubber cannot be obtained.

Platinum or platinum compound (D) imparts a self-extinguishing property to the composition. As component (D), there may be mentioned, for example, platinum per se, chloroplatinic acid, platinum-olefin complexes, platinum-alcohol complexes, platinum coordination compounds and platinum-vinylsiloxane complexes. As the platinum coordination compound, there is listed a platinum-phosphor complex obtained from chloroplatinic acid and trialkyl ($C_1$–$C_6$) phosphine, trialkyl($C_1$–$C_6$)phosphite, triphenylphosphine, or triphenylphosphite. Component (D) is used in an amount of 0.000001–0.005 part by weight, preferably 0.00001–0.0005 part by weight, per 100 parts by weight of component (A). If it is used in amounts above or below this range, the intended excellent self-extinguishing property cannot be obtained.

If necessary, the composition of the present invention may further contain an agent for imparting a thixotropic property to the composition such as organic bentonites and hydrogenated castor oil, colorants such as red iron oxide and titanium white and antiseptic agents. Further, for controlling its hardness and mechanical properties, a filler may be incorporated if necessary. As the filler, there may be mentioned reinforcing fillers such as fumed silica, precipitated silica and carbon black and non-reinforcing fillers such as quartz powder, heavy calcium carbonate, light calcium carbonate, titanium oxide, iron oxide, graphite and microballoon. The amount of the filler varies depending on the use of the composition and the variety of the filler. Usually, the filler is used in such an amount that the sum of the filler and finely divided aluminum hydroxide powder (C) is less than 300 parts by weight, preferably less than 200 parts by weight, per 100 parts by weight of polydiorganosiloxane (A). If the filler is used in a larger amount, the flexibility and elongation of the elastomer after curing are reduced.

Thus, according to the present invention, there is obtained a flame-retardant, room temperature vulcanizable polyorganosiloxane composition which can be colored in various colors, because it does not contain carbon or a copper compound as a fundamental ingredient, and which keeps the low modulus and high elongation which are peculiar to the cross-linking mechanism using aminoxy-group-containing organosilicon compound. The composition of the present invention is used widely as a sealing material for construction purposes.

BRIEF DESCRIPTION OF DRAWING

The drawing shows a test piece for the adhesion tensile test of the silicone sealing material. In the test, tensile stress is applied perpendicularly to the adhesion surfaces. Each numeral indicates length (mm). The substrate is numbered as 1 and the cured composition is numbered as 2. The present invention will be below shown in detail along with the following examples. In the examples, parts are given by weight and symbols have the following meanings:

$M_{150}$: Modulus at 150% elongation
TS: Tensile strength
E: Elongation
H: Hardness
Me: Methyl group
Et: Ethyl group
Pr: Propyl group
Hex: Hexyl group
Ph: Phenyl group

EXAMPLE 1

Compositions a–g comprising the components shown in Table 1 were obtained. In the preparation of those compositions, polydiorganosiloxanes S-1 through S-4 were charged in a kneader alone or in the form of a mixture. Then, finely divided powder of filler P-1 or P-2 was added thereto and the whole was kneaded to obtain a non-fluid pasty mixture. The pasty mixture was added with a cross-linking agent comprising 95 wt. % of

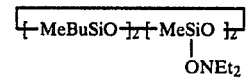

and 5 wt. % of

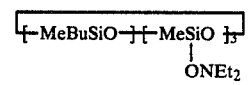

and aqueous chloroplatinic acid solution. Further, the ingredients were mixed sufficiently to obtain a composition.

S-1: Polydimethylsiloxane having terminal silanol groups and a viscosity of 5,000 cSt at 25° C.,
S-2: Polydiorganosiloxane having terminal silanol groups and a viscosity of 7,000 cSt at 25° C. in which 5 mole % of the total siloxy units comprises diphenylsiloxy units and the remainder comprise dimethylsiloxy units,
S-3: Polydimethylsiloxane having terminal trimethylsiloxy groups and a viscosity of 100 cSt at 25° C.,
S-4: Polydiorganosiloxane having terminal trimethylsiloxy groups and a viscosity of 1,000 cSt at 25° C. in which 33 mole % of the total siloxy units comprise diphenylsiloxy units and the remainder comprise dimethylsiloxy units.
P-1: Finely divided powder of heavy calcium carbonate, and
P-2: Aluminum hydroxide of an average particle diameter of 10 microns.

Among those compositions, compositions d and f are those according to the present invention and the others are comparative examples.

The above compositions a–g were cured to form sheets of a thickness of 1–2 mm and aged at room temperature for one week. The physical properties of them were examined to obtain the results shown in Table 1.

Table 1

| Composition | a (Comparative Example) | b (Comparative Example) | c (Comparative Example) | d (present Invention) | e (Comparative Example) | f (Present Invention) | g (Comparative Example) |
| --- | --- | --- | --- | --- | --- | --- | --- |
| Composition (part) | | | | | | | |
| S-1 | 100 | 100 | | | | | 90 |
| S-2 | | | 100 | 100 | 100 | 90 | |
| S-3 | | | | | | | 10 |
| S-4 | | | | | | 10 | |
| P-1 | 150 | | 150 | | | | |
| P-2 | | 150 | | 150 | 150 | 150 | 150 |
| Cross-linking agent | 3.0 | 3.0 | 3.0 | 3.0 | 3.0 | 3.0 | 3.0 |
| Chloroplatinic acid (as | 0.00005 | 0.00005 | 0.00005 | 0.00005 | | 0.00005 | 0.00005 |

Table 1-continued

| Composition | a (Comparative Example) | b (Comparative Example) | c (Comparative Example) | d (present Invention) | e (Comparative Example) | f (Present Invention) | g (Comparative Example) |
|---|---|---|---|---|---|---|---|
| platinum) |  |  |  |  |  |  |  |
| Physical properties |  |  |  |  |  |  |  |
| H (JIS) | 30 | 28 | 30 | 27 | 28 | 24 | 28 |
| TS (Kg/cm$^2$) | 6.7 | 7.9 | 7.3 | 8.8 | 8.1 | 7.2 | 8.2 |
| E (%) | 1270 | 1540 | 1250 | 1590 | 1530 | 1680 | 1380 |

EXAMPLE 2

Sheets prepared from compositions a–g in Example 1 were cut into strips of a width of 12.5 mm. The strips were placed 1 cm above the center of a flame of burning methane gas of a length of 2 cm for 10 seconds and then taken out. The time required from the taking-out to the disappearance of glow was measured. The results are shown in Table 2. The second extinguishing time in the table was determined by placing the sample in the flame again for 10 seconds directly after the first extinguishing, taking out the sample from the flame and measuring the extinguishing time.

Table 2

| Hardened Product | Thickness of Sheet (mm) | First self-extinguishing time (sec.) | Second self-extinguishing time (sec.) |
|---|---|---|---|
| a (Comparative Example) | 1.39 | Not extinguishing | — |
|  | 1.42 | " | — |
|  | 1.47 | " | — |
|  | 1.49 | " | — |
|  | 1.51 | " | — |
| b (Comparative Example) | 1.55 | 4 | 6 |
|  | 1.59 | 4 | 7 |
|  | 1.75 | 3 | 2 |
|  | 1.69 | 4 | 6 |
|  | 1.84 | 4 | 5 |
| c (Comparative Example) | 1.22 | Not extinguishing | — |
|  | 1.48 | " | — |
|  | 1.32 | " | — |
|  | 1.27 | " | — |
|  | 1.41 | " | — |
| d (Present Invention) | 1.39 | < 1 | < 1 |
|  | 1.49 | < 1 | < 1 |
|  | 1.47 | < 1 | < 1 |
|  | 1.51 | < 1 | < 1 |
|  | 1.48 | < 1 | < 1 |
| e (Comparative Example) | 1.41 | Not extinguishing | — |
|  | 1.28 | " | — |
|  | 1.28 | " | — |
|  | 1.43 | " | — |
|  | 1.33 | " | — |
| f (Present Invention) | 1.32 | < 1 | < 1 |
|  | 1.29 | < 1 | < 1 |
|  | 1.28 | < 1 | < 1 |
|  | 1.44 | < 1 | < 1 |
|  | 1.50 | < 1 | < 1 |
| g (Comparative Example) | 1.28 | Not extinguishing | — |
|  | 1.40 | " | — |
|  | 1.48 | " | — |
|  | 1.33 | " | — |
|  | 1.32 | " | — |

EXAMPLE 3

Test pieces were prepared from compositions a and d in Example 1 by forming a sample comprising a layer 2 of the composition sandwiched in between two substrates 1 as shown in the drawing and curing the composition. The physical properties of the test pieces were determined to obtain results shown in Table 3. As the substrate, glass was used.

Table 3

| Composition | $M_{150}$ (Kg/cm$^2$) | TS (Kg/cm$^2$) | E (%) |
|---|---|---|---|
| a (Comparative Example) | 2.1 | 4.2 | 810 |
| d (Present Invention) | 1.8 | 3.6 | 990 |

EXAMPLE 4

Compositions prepared in the same manner as composition d in Example 1 except that the molar ratio of diphenylsiloxy units based on the total siloxy units of the polydiorganosiloxanes having moleculars terminated with silanol groups and a viscosity at 25° C. were altered as shown in Table 4. The compositions were subjected to the same test as in Example 2 to obtain the following results:

Table 4

| Diphenylsiloxy unit (mole %) | Viscosity (cSt) | Thickness of sheet (mm) | First extinguishing time (sec.) | Second extinguishing time (sec.) | Amount of smoke |
|---|---|---|---|---|---|
| 1 | 3,000 | 1.57 | 3 | < 1 |  |
|  |  | 1.55 | < 1 | 2 |  |
|  |  | 1.40 | < 1 | 4 | Little |
|  |  | 1.71 | 3 | 2 |  |
|  |  | 1.35 | 2 | 3 |  |
| 3 | 50,000 | 1.44 | 1 | 3 |  |
|  |  | 1.45 | 1 | < 1 |  |
|  |  | 1.45 | < 1 | 1 | Little |
|  |  | 1.46 | 1 | < 1 |  |
|  |  | 1.55 | < 1 | 2 |  |
| 10 | 20,000 | 1.26 | 1 | < 1 |  |
|  |  | 1.48 | 1 | < 1 |  |
|  |  | 1.35 | < 1 | 3 | Comparatively |

Table 4-continued

| Diphenylsiloxy unit (mole %) | Viscosity (cSt) | Thickness of sheet (mm) | First extinguishing time (sec.) | Second extinguishing time (sec.) | Amount of smoke |
|---|---|---|---|---|---|
| | | | | | large |
| | | 1.41 | 1 | < 1 | |
| | | 1.22 | < 1 | < 1 | |
| | | 1.42 | < 1 | 2 | |
| | | 1.45 | 1 | < 1 | |
| 20 | 10,000 | 1.46 | < 1 | 3 | Large |
| | | 1.55 | < 1 | 2 | |
| | | 1.41 | 1 | < 1 | |

EXAMPLE 5

The same composition as composition d in Example 1 was subjected to the same tests as in Example 2 and 3 except that the amount of finely divided powder of aluminum hydroxide was altered to obtain results shown in Table 5.

Table 5

| Aluminum hydroxide (part) | Thickness of sheet (mm) | First extinguishing time (sec.) | Second extinguishing time (sec.) | $M_{150}$ (Kg/cm$^2$) | TS (Kg/cm$^2$) | E (%) |
|---|---|---|---|---|---|---|
| | 1.43 | < 1 | 2 | | | |
| | 1.59 | 1 | < 1 | | | |
| 100 | 1.56 | 2 | 3 | 1.6 | 3.6 | 950 |
| | 1.61 | 1 | < 1 | | | |
| | 1.47 | 2 | 3 | | | |
| | 1.45 | < 1 | < 1 | | | |
| | 1.30 | < 1 | < 1 | | | |
| 200 | 1.42 | < 1 | < 1 | 2.3 | 3.3 | 760 |
| | 1.36 | < 1 | < 1 | | | |
| | 1.35 | < 1 | < 1 | | | |
| | 1.32 | < 1 | < 1 | | | |
| | 1.41 | < 1 | < 1 | | | |
| 250 | 1.18 | < 1 | < 1 | 3.1 | 3.9 | 480 |
| | 1.41 | < 1 | < 1 | | | |
| | 1.33 | < 1 | < 1 | | | |

EXAMPLE 6

The same test as in Example 2 was effected except that quantity, calculated as platinum, of aqueous chloroplatinic acid solution in composition d in Example 1 was altered as shown in Table 6 and that the finely divided powder of aluminum hydroxide was surface-treated with stearic acid. The results are shown in Table 6.

Table 6

| Amount of platinum (part) | Thickness of sheet (mm) | First extinguishing time (sec.) | Second extinguishing time (sec.) |
|---|---|---|---|
| | 1.45 | 2 | 1 |
| | 1.50 | < 1 | 5 |
| 0.00001 | 1.60 | 2 | < 1 |
| | 1.22 | < 1 | 5 |
| | 1.54 | 3 | 5 |
| | 1.27 | < 1 | < 1 |
| | 1.23 | < 1 | < 1 |
| 0.0001 | 1.15 | < 1 | < 1 |
| | 1.60 | < 1 | < 1 |
| | 1.25 | < 1 | < 1 |
| | 1.14 | 3 | < 1 |
| | 1.30 | 2 | 1 |
| 0.0005 | 1.26 | 3 | < 1 |
| | 1.27 | 3 | < 1 |
| | 1.32 | 3 | < 1 |

EXAMPLE 7

The same compositions as composition d in Example 1 were prepared except that the aminoxy group-containing organic compound and the amount thereof were altered as shown in Table 7. The compositions were molded into sheets of a thickness of 1-2 mm and cured at room temperature for one week. The self-extinguishing properties of them were determined in the same manner as in Example 2 to obtain the results as shown in Table 7. The amount in the table are given per 100 parts of the non-fluid pasty mixture.

Table 7

| Aminoxy group-containing organosilicon compound | | | Self-extinguishing time (second) | |
|---|---|---|---|---|
| Variety | Weight ratio (%) | Amount (part) | First | Second |
| $\{-Me_2SiO-\}_{\overline{x}}\{-MeSiO-\}_{\overline{z}}$<br>                                ONEt$_2$ | 80<br><br>20 | 3.0 | < 1 | < 1 |
| $\{-Me_2SiO-\}_{\overline{1}}\{-MeSiO-\}_{\overline{3}}$<br>                                ONEt$_2$ | 75 | | | |
| $\{-Me_2SiO-\}_{\overline{x}}\{-MeSiO-\}_{\overline{z}}$<br>                                ONEt$_2$ | | 3.0 | < 1 | < 1 |
| PhSi[OMe$_2$SiONPr$_2$]$_3$ | 25 | | | |
| $\{-Me_2SiO-\}_{\overline{x}}\{-MeSiO-\}_{\overline{z}}$<br>                                ONEt$_2$ | 92 | 2.5 | < 1 | < 1 |
| EtSi[ONEt$_2$]$_3$ | 8 | | | |
| Si[ONEt$_2$]$_4$ | 100 | 0.8 | < 1 | < 1 |
| PhSi[ON⌐(CH$_2$)$_4$⌐]$_3$ | 100 | 1.0 | < 1 | < 1 |

EXAMPLE 8

150 Parts of finely divided powder of aluminum hydroxide surface-treated with metaphosphoric acid and having an average particle diameter of 10 microns and 50 parts of heavy calcium carbonate were added to 100 parts of a polydiorganosiloxane of a viscosity at 25° C. of 10,000 cSt wherein the molecular chain was terminated with silanol groups, about 10 mole % of the total siloxy units was methylphenylsiloxy units and the remainder were dimethylsiloxy units. The ingredients were kneaded with a kneader to obtain a non-fluid pasty mixture. 100 Parts of the mixture were added with 3.0 parts of a mixture comprising 10 wt. % of a compound of the formula:

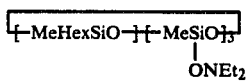

and 90 wt. % of a compound of the formula:

and 0.00005 part, calculated as platinum of aqueous chloroplatinic acid solution. After thorough stirring, the mixture was cured into a sheet of a thickness of 1–2 mm and aged at room temperature for one week. Thereafter, the self-extinguishing property of the product was determined. The self-extinguishing time was less than 1 second in the first and the second tests.

EXAMPLE 9

A composition was prepared in the same manner as composition d in Example 1 except that a polydiorganosiloxane of a viscosity at 25° C. of 8,000 cSt wherein the molecular chain was terminated with hydroxyl groups, about 5 mole % of the total siloxy units were diphenylsiloxy units, 10 mole % were methyl (3,3,3-trifluoropropyl) siloxy units and the remainder were dimethylsiloxy units was used as the polydiorganosiloxane wherein the molecular chain is terminated with silanol groups. The composition was cured into a sheet of a thickness of 1–2 mm and aged at room temperature for one week. Thereafter, the self-extinguishing property of the product was determined. The self-extinguishing time was less than 1 second in the first and the second tests.

EXAMPLE 10

Compositions were prepared in the same manner as composition d in Example 1 except that polydiorganosiloxane in composition d was replaced with a mixture of silanol-terminated polydimethylsiloxane having a viscosity of 5,000 cSt at 25° C. (S-5) and trimethylsilyl-group-terminated polymethylphenylsiloxane, having about 30 mole % of diphenylsiloxy units and a viscosity of 1,000 cSt at 25° C. (S-6) in a weight ratio as shown in Table 8. The resulting compositions were tested in the same manner as in Example 2 to obtain the following results:

Table 8

| Weight ratio | Thickness of sheet (mm) | First extinguishing time (sec.) | Second extinguishing time (sec.) | Amount of smoke |
|---|---|---|---|---|
| | 1.45 | 2 | 2 | |
| 97.5 : 2.5 | 1.41 | 2 | <1 | |
| | 1.55 | 2 | <1 | Small |
| | 1.70 | <1 | 3 | |
| | 1.62 | 2 | 2 | |
| | 1.34 | <1 | <1 | |
| | 1.35 | <1 | 2 | |
| 95 : 5 | 1.35 | <1 | 1 | Small |
| | 1.30 | <1 | <1 | |
| | 1.43 | 1 | <1 | |
| | 1.46 | <1 | <1 | |
| | 1.45 | <1 | 1 | |
| 80 : 20 | 1.45 | <1 | 1 | Relatively large |
| | 1.42 | <1 | 1 | |
| | 1.49 | <1 | <1 | |

EXAMPLE 11

Compositions were prepared in the same manner as composition d in Example 1 except that platinum complexes as shown below were used in place of aqueous chloroplatinic acid solution. The resulting compositions were subjected to the same test as in Example 2.

Experiment 1: 0.001 Part, calculated as platinum, of a complex obtained by reacting chloroplatinic acid with tributylphosphine in ethanol at 70° C. and filtering the product.

Experiment 2: 0.0001 Part, calculated as platinum, of a complex obtained by reacting chloroplatinic acid with tributylphosphite in ethanol at 70° C. and filtering the product.

Experiment 3: 0.0001 Part, calculated as platinum, of a complex obtained by reacting chloroplatinic acid with tetramethyltetravinylcyclotetrasiloxane at 100° C.

Experiment 4: 0.00005 Part, calculated as platinum, of a complex obtained by reacting chloroplatinic acid with octyl alcohol at 130° C. and distilling out the remaining octyl alcohol under reduced pressure.

In each test, self-extinguishing time was less than 1 second in the first and the second tests.

The embodiments of the invention of which an exclusive property or privilege is claimed are defined as follows:

1. A room temperature vulcanizable polyorganosiloxane composition comprising:
   (A) 100 parts by weight of polydiorganosiloxane component having a viscosity of from 100 to 1,000,000 cSt at 25° C. and wherein from 0.1 to 25 mole percent of the total organo groups are phenyl groups, said polydiorganosiloxane component being selected from the group consisting of (1) silanol-terminated polydiorganosiloxane and (2) a mixture of (a) more than 60 weight percent of silanol-terminated polydiorganosiloxane and the balance is (b) triorganosilyl group-terminated polydiorganosiloxane,
   (B) 0.1 to 50 parts by weight of substituted aminoxy group-containing organosilicon component, said substituted aminoxy group having the formula

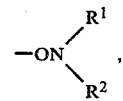

wherein $R^1$ and $R^2$ each is a monovalent hydrocarbon group, or the formula

wherein $R^3$ is a divalent organic group, said substituted aminoxy group-containing organosilicon component having more than two of said substituted aminoxy groups bonded to a silicon atom or silicon atoms, on the average, per molecule,
   (C) 75 to 300 parts by weight of aluminum hydroxide powder having a particle size of less than 50 microns, and (D) 0.000001 to 0.005 parts by weight, calculated as platinum metal, of platinum metal, platinum compound or mixture thereof.

2. A composition according to claim 1 wherein the organo groups, other than phenyl groups, in said polydiorganosiloxane component (A) are methyl groups.

3. A composition according to claim 1 wherein the polydiorganosiloxane component (A) comprises more than 80 weight percent of silanol-terminated polydiorganosiloxane and has a viscosity of 500 to 100,000 cSt at 25° C. and 0.1 to 10 mole % of the total organo groups thereof are phenyl groups.

4. A composition according to claim 1 wherein said substituted aminoxy group is —ON(C$_2$H$_5$)$_2$.

5. A composition according to claim 1 wherein said aluminum hydroxide powder is surface-treated with stearic acid or metaphosphoric acid.

6. A composition according to claim 1 which further contains an inorganic filler in such an amount that the sum of the inorganic filler and aluminum hydroxide powder is less than 300 parts by weight.

7. A composition according to claim 1 in which R$^1$ and R$^2$, which are the same or different, are selected from the group consisting of alkyl having 1 to 8 carbon atoms, cyclohexyl, vinyl and phenyl, and R$^3$ is selected from the group consisting of alkylene having 3 to 6 carbon atoms and ethyleneoxyethylene group.

8. A composition according to claim 1 further containing organic bentonite, hydrogenated castor oil, colorant, and/or filler.

9. A composition according to claim 1, wherein said substituted aminoxy group-containing organosilicon component is selected from the group consisting of C$_6$H$_5$Si[O(CH$_3$)$_2$SiON(C$_3$H$_7$)$_2$]$_3$,
(C$_2$H$_5$)$_2$NO(CH$_3$)$_2$SiO(CH$_3$)$_2$SiON(C$_2$H$_5$)$_2$,
(C$_2$H$_5$)$_2$NO(CH$_3$)$_2$SiO(C$_6$H$_5$)$_2$SiO(CH$_3$)$_2$SiON(C$_2$H$_5$)$_2$, CH$_3$Si[ON⌐(CH$_2$)$_4$⌐]$_3$, (CH$_2$=CH)(CH$_3$)Si[ON⌐(CH$_2$)$_4$⌐]$_2$,

[(CH$_3$)SiO]$_4$
        |
        ON(C$_2$H$_5$)$_2$,

[―(CH$_3$)(C$_4$H$_9$)SiO―]$_{\overline{x}}$[―(CH$_3$)SiO―]$_{\overline{y}}$
                              |
                              ON(C$_2$H$_5$)$_2$ CH$_2$CH$_2$
                   /        \
(CH$_2$=CH)(CH$_3$)Si[ON          O]$_2$
                   \        /
                    CH$_2$CH$_2$ CH$_3$Si[ON(C$_6$H$_5$)$_2$]$_3$

[―(CH$_3$)(C$_4$H$_9$)SiO―]$_{\overline{x}}$[―(CH$_3$)SiO―]$_{\overline{y}}$
                              |
                              ON(C$_2$H$_5$)$_2$

[―(CH$_3$)$_2$SiO―]$_{\overline{x}}$[―(CH$_3$)SiO―]$_{\overline{y}}$
                              |
                              ON(C$_2$H$_5$)$_2$

[―(CH$_3$)(C$_6$H$_{13}$)SiO―]$_{\overline{x}}$[―(CH$_3$)SiO―]$_{\overline{y}}$
                              |
                              ON(C$_2$H$_5$)$_2$

[―(CH$_3$)$_2$SiO―]$_{\overline{x}}$[―(CH$_3$)SiO―]$_{\overline{y}}$
                              |
                              ON(C$_2$H$_5$)$_2$ Si[ONC$_2$H$_5$]$_4$, C$_6$H$_5$Si[ON⌐(CH$_2$)$_4$⌐]$_3$, C$_2$H$_5$Si[ONC$_2$H$_5$]$_3$, and mixtures thereof.

10. A composition according to claim 3, in which the amount of said substituted aminoxy group-containing organosilicon component is from 1 to 10 parts by weight, the amount of said aluminum hydroxide powder is from 100 to 200 parts by weight and the amount of component (D) is from 0.00001 to 0.0005 parts by weight.

11. A process for preparing a room temperature vulcanizable polyorganosiloxane composition which comprises: mixing
(A) 100 parts by weight of polydiorganosiloxane component having a viscosity of from 100 to 1,000,000 cSt at 25° C. and wherein from 0.1 to 25 mole percent of the total organo groups are phenyl groups, said polydiorganosiloxane component being selected from the group consisting of (1) silanol-terminated polydiorganosiloxane and (2) a mixture of (a) more than 60 weight percent of silanol-terminated polydiorganosiloxane and the balance is (b) triorganosilyl group-terminated polydiorganosiloxane,
(B) 0.1 to 50 parts by weight of substituted aminoxy group-containing organosilicon component, said substituted aminoxy group having the formula $$-ON\begin{matrix}R^1\\ \diagdown\\ R^2\end{matrix},$$

wherein R$^1$ and R$^2$ each is a monovalent hydrocarbon group, or the formula

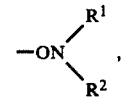

wherein R$^3$ is a divalent organic group, said substituted aminoxy group-containing organosilicon component having more than two of said substituted aminoxy groups bonded to a silicon atom or silicon atoms, on the average, per molecule,
(C) 75 to 300 parts by weight of aluminum hydroxide powder having a particle size of less than 50 microns, and
(D) 0.000001 to 0.005 parts by weight, calculated as platinum, of platinum metal, platinum compound or mixture thereof.

12. An elastomer obtained by vulcanizing the composition according to claim 1 at room temperature.

* * * * *